United States Patent [19]

Kalies

[11] Patent Number: 5,120,170
[45] Date of Patent: Jun. 9, 1992

[54] APPARATUS FOR RETAINING A NUT ON A SPINDLE

[75] Inventor: Ken E. Kalies, Seminole, Okla.

[73] Assignee: Hayes Axle, Inc., Seminole, Okla.

[21] Appl. No.: 748,100

[22] Filed: Aug. 21, 1991

[51] Int. Cl.⁵ .............................................. F16B 39/04
[52] U.S. Cl. .................................. 411/213; 411/300; 411/320; 411/945
[58] Field of Search ............... 411/208, 212, 213, 300, 411/319, 320, 363, 364, 513–515, 945

[56] References Cited

U.S. PATENT DOCUMENTS

| | | | |
|---|---|---|---|
| 803,300 | 10/1905 | Morris | 411/945 |
| 1,132,521 | 3/1915 | Jennings | 411/300 |
| 1,188,916 | 6/1916 | Dollman | 411/300 |
| 1,540,055 | 6/1925 | Chilton | 411/213 |
| 1,931,386 | 10/1933 | Hughes | 411/300 |

FOREIGN PATENT DOCUMENTS 691756 10/1930 France ............................ 411/320

*Primary Examiner*—Neill R. Wilson
*Attorney, Agent, or Firm*—Renner, Kenner, Greive, Bobak, Taylor & Weber

[57] ABSTRACT

The present invention provides an improved system (30) for maintaining the position of a castellated nut (34) on a spindle (31) having an axial bore (33) therethrough. The improved system (30) utilizes chordal bore (36) passing through the spindle (31). After the castellated nut (34) is positioned on the spindle (31) a cotter pin (37) is placed within chordal bore (36). The cotter pin (37) is of sufficient length such that both ends (38, 39) thereof extend from the drilled spindle and engage the slots (35) of the castellated nut (34). Thus, the cotter pin (37) prevents rotation of castellated nut (34) maintaining the proper position thereof.

2 Claims, 1 Drawing Sheet

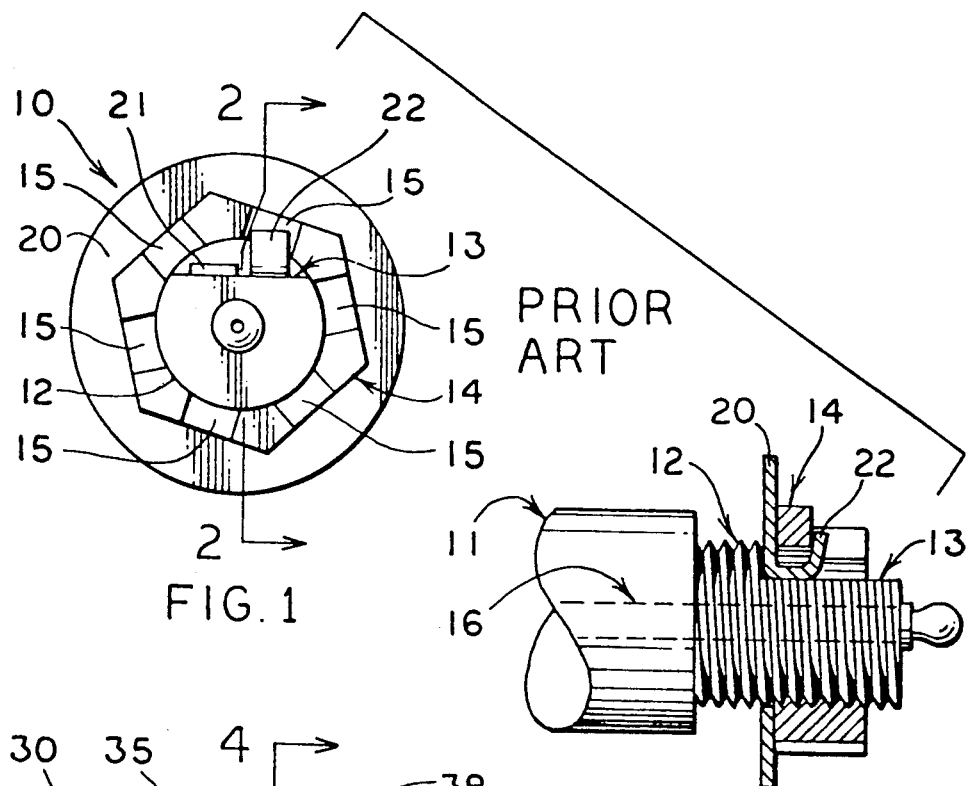
FIG. 1 PRIOR ART
FIG. 2
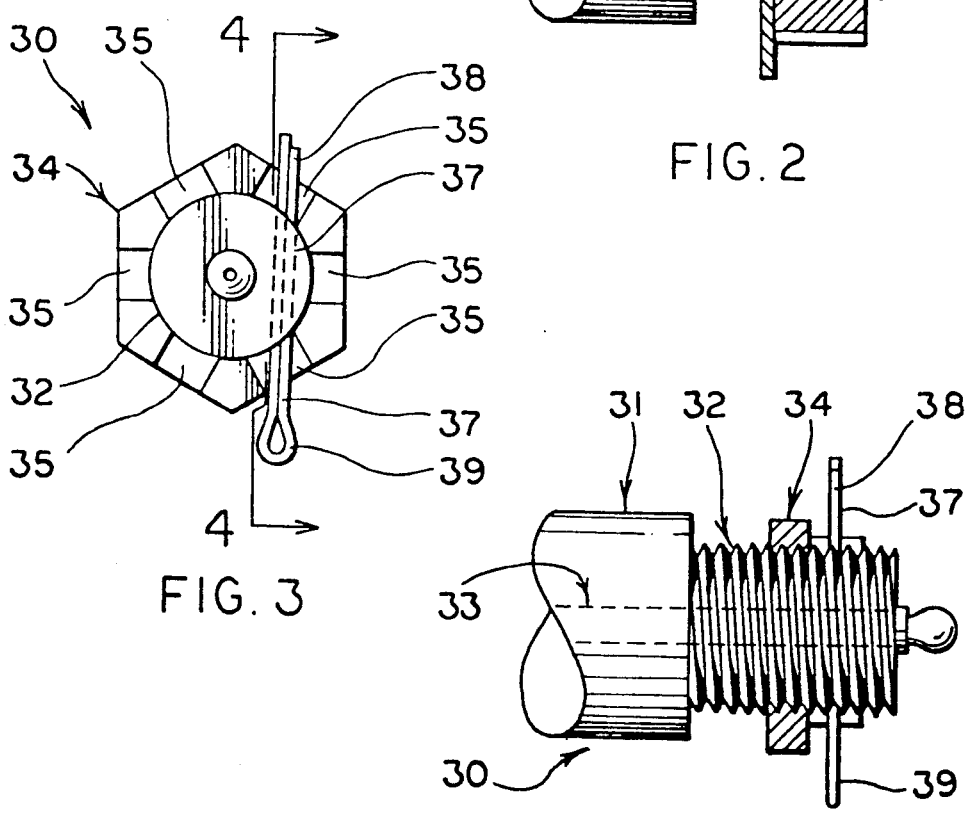
FIG. 3
FIG. 4

APPARATUS FOR RETAINING A NUT ON A SPINDLE

TECHNICAL FIELD

This invention relates to an improved combination for maintaining a castellated nut on a drilled spindle. More specifically, this invention provides an offset cotter pin mounted in a drilled spindle for retaining a castellated nut on the spindle.

BACKGROUND ART

Typical axle/hub assemblies for non-driven wheels of a vehicle consist of a hub, a spindle, inner and outer wheel bearings, grease seals and a nut for retaining the hub on the spindle. Normally, a castellated nut is utilized to maintain the hub on the spindle. In order to maintain proper adjustment of the bearings and also to prevent the loss of a hub, the position of the castellated nut relative to the spindle and hub must be maintained. This presents a problem on certain vehicles which utilize a drilled or bored spindle thereby providing a lateral passageway within the spindle. Under such conditions the bore must remain unobstructed and the castellated nut is typically maintained on the spindle by means of a "D" washer. A "D" washer is one which carries a finger which may be bent upward into one of the slots of the castellated nut.

Proper adjustment of the wheel bearings is necessary for safe operation of the vehicle. Normally, the wheel bearings are adjusted by tightening or loosening the castellated nut. Thus, proper engagement of the castellated nut by the "D" washer is necessary to insure safe operation. However, use of such washers is difficult inasmuch as they are made of thin metal and frequently will become caught in the threads of the spindle during adjustment of the bearings. This may result in improperly adjusted bearings producing a premature failure thereof. An additional draw back arising from use of a "D" washer is the difficulty in finding replacements in the field.

DISCLOSURE OF THE INVENTION

It is thus a primary object of the present invention to provide an improved apparatus for retaining a hub on the spindle of a vehicle.

It is another object of the present invention to provide the improved apparatus, as above, for retaining a castellated nut on a drilled spindle.

It is another object of the present invention to provide the improved apparatus, as above, for maintaining the proper adjustment of the bearings within a hub on a drilled spindle.

It is yet another object of the present invention to provide the improved apparatus, as above, having a chordal bore passing through the drilled spindle for receiving a cotter pin in order to maintain a castellated nut on the spindle.

These and other objects of the present invention, as well as the advantages thereof over existing prior art forms, which will become apparent from the description to follow, are accomplished by means hereinafter described and claimed.

In general, the apparatus of the present invention includes a spindle having an axial bore therethrough and threads for engaging a castellated nut. The drilled spindle also has a chordal bore passing therethrough suitable for receiving a cotter pin. The cotter pin is of sufficient length such that the first end thereof extends from the spindle to engage a slot of the castellated nut and the second end of the cotter pin extends from the spindle to engage another slot of the castellated nut. Thus, the cotter pin effectively maintains the castellated nut on the spindle.

The preferred exemplary embodiment of the present invention is shown by way of example in the accompanying drawings without attempting to show all the various forms and modifications in which the invention may be embodied, the invention being measured by the appended claims and not the details of the specification.

BRIEF DESCRIPTION OF THE DRAWINGS

FIG. 1 is an end view of a prior art spindle showing a castellated nut held in position by a "D" washer.

FIG. 2 is a sectional view of the prior art taken substantially along line 2—2 of FIG. 1.

FIG. 3 is an end view of the apparatus of the present invention demonstrating the offset cotter pin engaging the castellated nut.

FIG. 4 is a sectional view taken substantially along line 4—4 of FIG. 3.

PREFERRED EMBODIMENT FOR CARRYING OUT THE INVENTION

In order to fully appreciate the significance of the design of the apparatus of the present invention, a discussion of the prior art, as shown in FIGS. 1 and 2, will be helpful. The prior art apparatus is indicated generally by the number 10 and includes a spindle 11, having an externally threaded portion 12. Threaded portion 12 of spindle 11 is additionally provided with a smooth flat machined surface 13. Carried by the spindle 11 and engaging threads 12 is a castellated nut 14 having several circumferentially spaced slots 15. Spindle 11 also has an axial bore 16 passing therethrough.

Also carried by spindle 11 is a "D" washer 20. "D" washer 20 includes two fingers 21 and 22 extending inwardly. "D" washer 20 is positioned on spindle 11 with its fingers 21 and 22 being positioned adjacent and otherwise parallel to flat surface 13. Placement of "D" washer 20 in this manner precludes free rotation of "D" washer 20 on spindle 11.

Adjustment of the bearings (not shown) within the hub (also not shown) is achieved by tightening or loosening castellated nut 14. Once the bearings are properly adjusted, the position of castellated nut 14 is secured by bending either finger 21 or 22 over, such as finger 22 shown in FIG. 2, so that it engages a slot 15. This prior art configuration shown in FIGS. 1 and 2 suffers from the problems previously described.

The improved system for maintaining a castellated nut on a spindle according to the concepts of the present invention which solves these problems is shown in FIGS. 3 and 4 and is generally indicated by the numeral 30. System 30 includes a spindle 31 which like spindle 11 has a threaded portion 32 and an axial bore 33 therethrough. However, the threaded portion 32 of spindle 31 need not have the flat area as in the prior art. A castellated nut 34 having a plurality of circumferentially spaced slots 35 is threaded onto spindle 31. Spindle 31 is also provided with a bore 36 which does not pass through the center thereof but rather defines a chord of the circular spindle 31 as viewed in FIG. 3. As shown, the chord defined by bore 36 preferably subtends an arc of approximately 120°. A cotter pin 37 is located within bore 36 and is of sufficient length, such that one end 38 thereof extends beyond spindle 31 and engages a slot 35 of castellated nut 34 with the other end 39 of cotter pin 37 extending beyond spindle 31 to engage another slot 35 of castellated nut 34 at a point 120° from the point of engagement by first end 38 of cotter pin 37. Thus, cotter pin 37 effectively maintains castellated nut 34 on spindle 31 without the need for a "D" washer. Additionally, as cotter pin 37 does not pass through the center of drilled spindle 31, the center region and axial bore 33 thereof remains unobstructed and free for other applications.

It should thus be apparent that the system for retaining a castellated nut on a drilled spindle according to the concept of the present invention, as described herein, substantially improves the art and otherwise accomplishes the objects of the present invention.

I claim:

1. An apparatus for retaining a castellated nut on a spindle, the spindle having an axial bore therethrough and external threads to engage the castellated nut, the castellated nut having a plurality of circumferentially spaced slots at an axial end thereof, the apparatus comprising a chordal bore passing through the spindle, a cotter pin positioned within said chordal bore, said cotter pin having a first end and a second end and being of sufficient length such that said first end extends outwardly of said chordal bore to engage a slot of the castellated nut, and said second end extends outwardly of said chordal bore to engage another slot of the castellated nut to prevent rotation of the castellated nut such that said axial bore of said spindle is unobstructed by said cotter pin.

2. The apparatus according to claim 1, wherein said chordal bore is located in said spindle so as to subtend approximately a 120° arc between the ends of said bore.

* * * * *